United States Patent
Hsu et al.

(10) Patent No.: US 10,237,932 B1
(45) Date of Patent: Mar. 19, 2019

(54) LIGHT-EMITTING DIODE LIGHTING SYSTEM WITH AUTOMATIC BLEEDER CURRENT CONTROL

(71) Applicant: IML International, Grand Cayman (KY)

(72) Inventors: Horng-Bin Hsu, Taipei (TW); Yi-Mei Li, New Taipei (TW); Yung-Hsin Chiang, New Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 16/057,782

(22) Filed: Aug. 7, 2018

Related U.S. Application Data

(60) Provisional application No. 62/666,073, filed on May 2, 2018.

(51) Int. Cl.
*H05B 33/08* (2006.01)

(52) U.S. Cl.
CPC ..... *H05B 33/0815* (2013.01); *H05B 33/0845* (2013.01)

(58) Field of Classification Search
CPC ............ H05B 33/0815; H05B 33/0851; H05B 33/0818; H05B 33/0845; H05B 33/0824; H05B 33/0827; H05B 37/029; H05B 33/089

USPC ..................... 315/291, 307, 186, 297, 200 R
See application file for complete search history.

(56) References Cited

U.S. PATENT DOCUMENTS

2012/0268040 A1* 10/2012 Riesebosch .......... H05B 33/089
315/309

FOREIGN PATENT DOCUMENTS

| CN | 106888524 | 6/2017 |
|---|---|---|
| CN | 106912144 | 1/2018 |

* cited by examiner

*Primary Examiner* — Wei (Victor) Chan
(74) *Attorney, Agent, or Firm* — Winston Hsu

(57) ABSTRACT

An LED lighting system includes a luminescent unit driven by a rectified AC voltage, a dimmer switch configured to adjusting a duty cycle of a system current, and a bleeder circuit. The bleeder circuit includes a first current source, a second current source, a third current source, a current-sensing element for providing a first feedback voltage associated with the system current, a capacitor, and a control unit. The control unit is configured to activate the first current source and deactivate the second current source for charging the capacitor when the system current exceeds a predetermined threshold, deactivate the first current source and activate the second current source for discharging the capacitor when the system current does not exceed the predetermined threshold, and deactivate the third current source to stop supplying the bleeder current according to a second feedback voltage established across the capacitor.

7 Claims, 8 Drawing Sheets

US 10,237,932 B1

LIGHT-EMITTING DIODE LIGHTING SYSTEM WITH AUTOMATIC BLEEDER CURRENT CONTROL

CROSS REFERENCE TO RELATED APPLICATIONS

This application claims the benefit of U.S. provisional application No. 62/666,073 filed on 2018 May 2.

BACKGROUND OF THE INVENTION

1. Field of the Invention

The present invention is related to an LED lighting system, and more particularly, to a dimmable LED lighting system with automatic bleeder current control.

2. Description of the Prior Art

A dimmable LED lighting system often uses a dimmer switch that employ a TRIAC (triode for alternative current) device to regulate the power delivered to an LED lamp by conducting only during a certain period of an alternative-current (AC) voltage supplied to the TRIAC. Unlike other switching elements such as BJTs or MOSFETs, the TRIAC will latch-on once it is energized (after forward current $I_F$ exceeds latching current $I_L$) and continue to conduct until the forward current $I_F$ drops below a minimum holding current $I_H$. To maintain the TRIAC in the conducting state, the minimum holding current $I_H$ needs to be supplied to the TRIAC. At turn-on, an LED load presents relatively high impedance, so input current may not be sufficient to latch the TRIAC in the dimmer switch. When the current through the TRIAC is less than the minimum holding current $I_H$, the TRIAC resets and pre-maturely turns off the dimmer switch. As a result, the LED lamp may prematurely turn off when it should be on, which may result in a perceivable light flicker or complete failure in the LED lighting system.

Therefore, a bleeder circuit is used to provide a bleeder current for voltage management and preventing the dimmer switch from turning off prematurely. However, when the dimming function of an LED lighting system is not activated, the unnecessary supply of the bleeder current costs extra power consumption.

SUMMARY OF THE INVENTION

The present invention provides an LED lighting system which includes a luminescent unit and a bleeder circuit. The luminescent unit is driven by a rectified AC voltage. The bleeder circuit includes a first current source configured to provide a charging current, a second current source configured to provide a discharging current, a third current source configured to provide a bleeder current, a current-sensing element for providing a first feedback voltage associated with a level of the system current, a capacitor, and a control unit. The control unit is configured to activate the first current source and deactivate the second current source for charging the capacitor when the system current exceeds a predetermined threshold according to the first feedback voltage, deactivate the first current source and activate the second current source for discharging the capacitor when the system current does not exceed the predetermined threshold according to the first feedback voltage, and deactivate the third current source to stop supplying the bleeder current according to a second feedback voltage established across the capacitor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
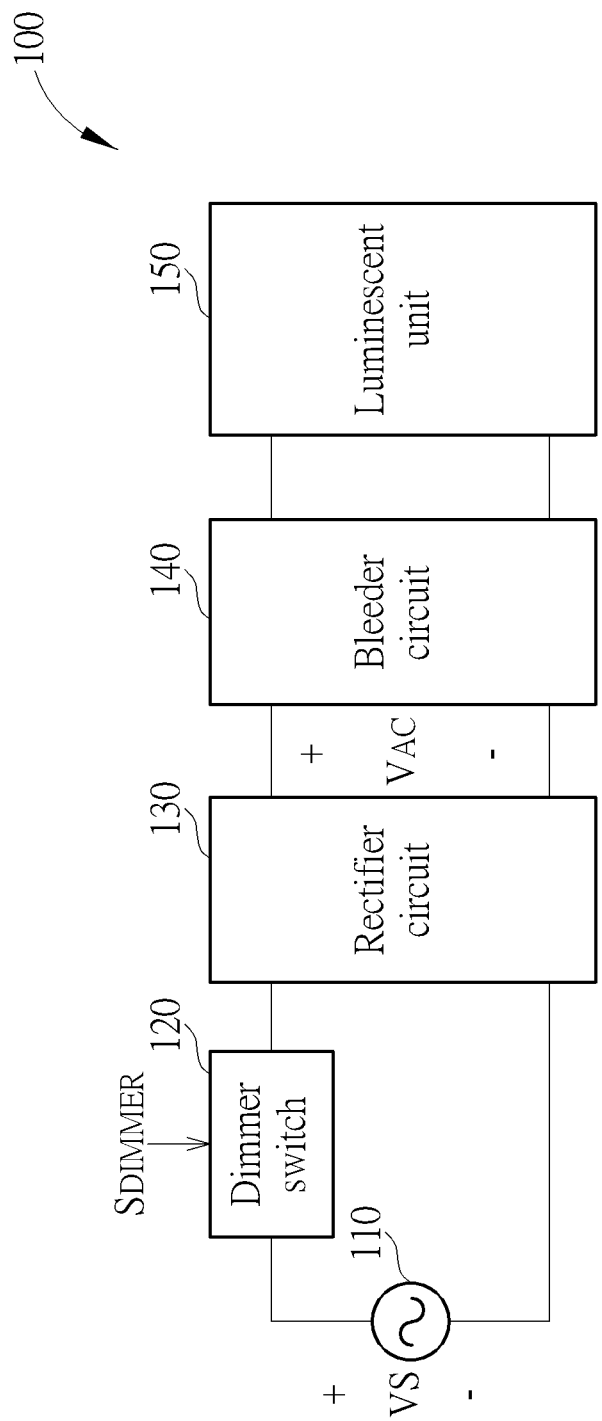
FIG. 1 is a functional diagram of a dimmable LED lighting system according to an embodiment of the present invention.

FIG. 1 is a functional diagram of a dimmable LED lighting system 100 according to an embodiment of the present invention. The LED lighting system 100 includes a power supply circuit 110, a dimmer switch 120, a rectifier circuit 130, a bleeder circuit 140, and a luminescent unit 150.

The power supply circuit 110 may be an alternative current (AC) mains which provides an AC voltage VS having positive and negative periods. The rectifier circuit 130 may include a bridge rectifier for converting the AC voltage VS into a rectified AC voltage $V_{AC}$ whose value varies periodically with time. However, the configurations of the power supply circuit 110 and the rectifier circuit 130 do not limit the scope of the present invention.

The luminescent unit 150 includes one or multiple luminescent devices and a driver. Each of the luminescent devices may adopt a single LED or multiple LEDs coupled in series. Each LED may be a single-junction LEDs, a multi-junction high-voltage (HV) LED, or another device having similar function. However, the type and configuration of the luminescent devices do not limit the scope of the present invention.

Figure 2:
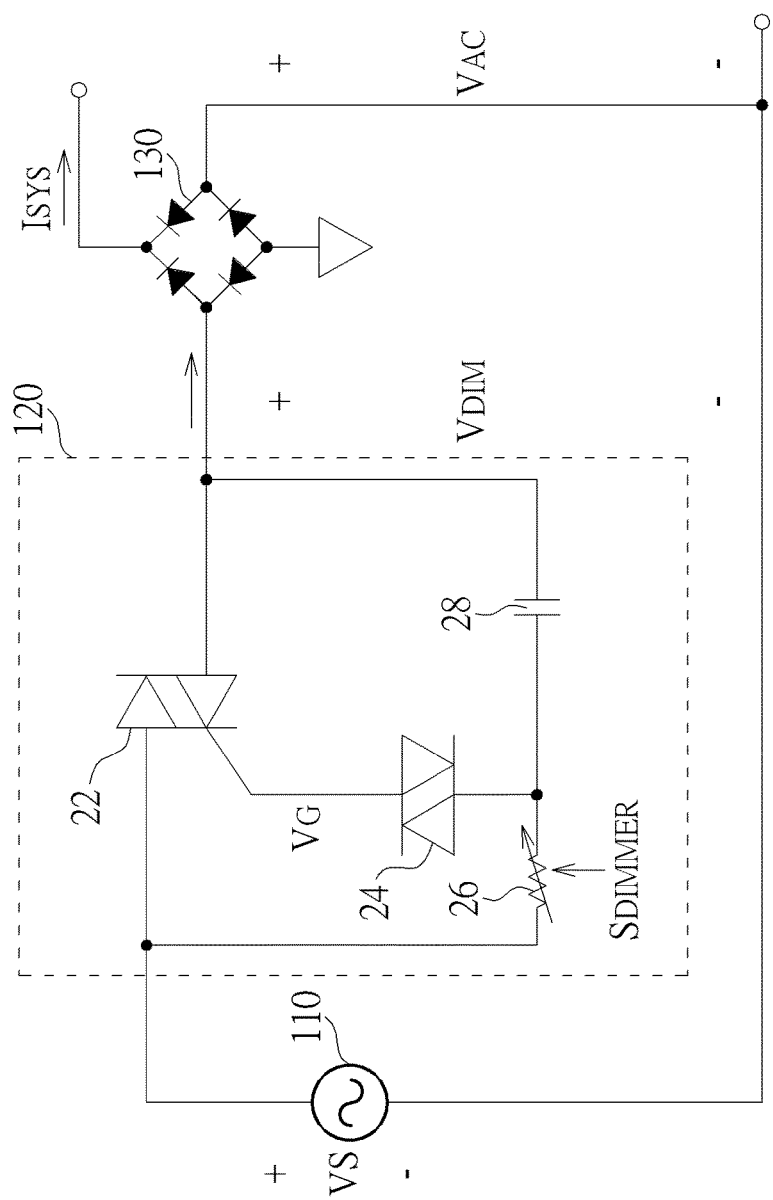
FIG. 2 is a diagram illustrating a dimmer switch in an LED lighting system according to an embodiment of the present invention.
Figure 3:
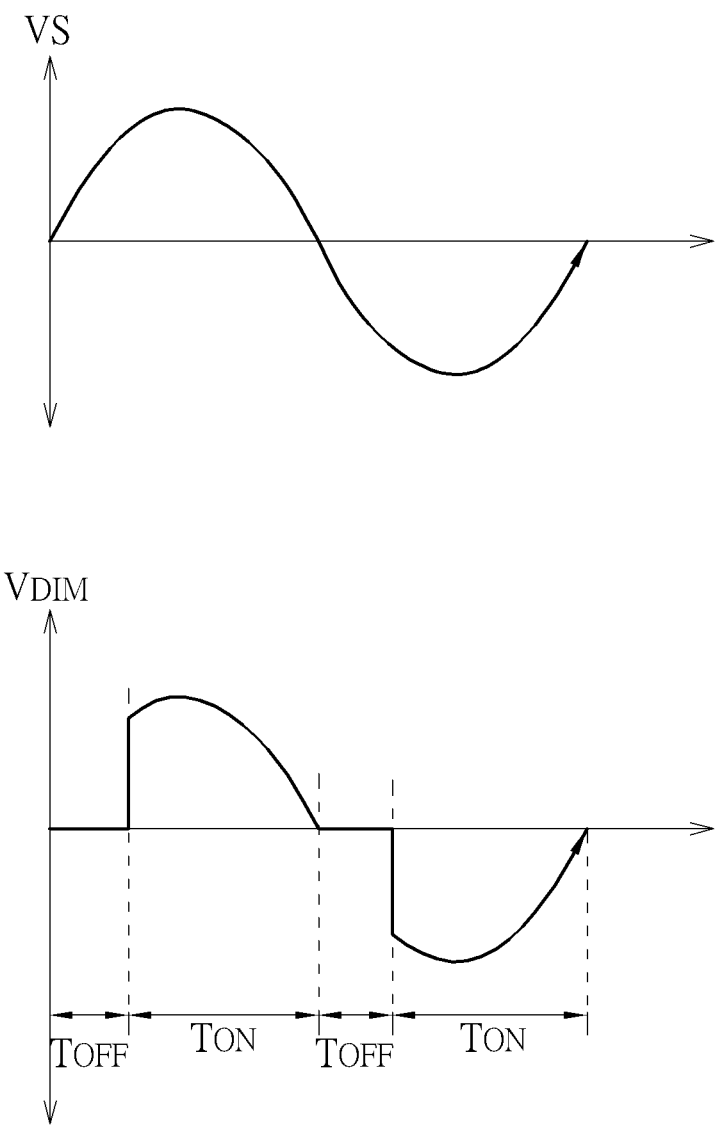
FIG. 3 is a diagram illustrating the operation of a dimmer switch in an LED lighting system according to an embodiment of the present invention.

FIG. 2 is a diagram illustrating the dimmer switch 120 in the LED lighting system 100 according to an embodiment of the present invention. FIG. 3 is a diagram illustrating the operation of the dimmer switch 120 in the LED lighting system 100 according to an embodiment of the present invention. The dimmer switch 120 is configured to control the amount (i.e., intensity) of light output by the luminescent unit 150 by phase modulating the power supply circuit 110 to adjust the duty cycle of the rectified voltage $V_{AC}$, thereby adjusting the duty cycle of the system current $I_{SYS}$ flowing through the LED lighting system 100. When the dimmer switch 120 is not in function, the voltage $V_{DIM}$ supplied to the rectifier circuit 130 is equal to the rectified AC voltage $V_{AC}$ provided by the power supply circuit 110; when the dimmer switch 120 is in function, the voltage $V_{DIM}$ supplied to the rectifier circuit 130 is provided by phase modulating the AC voltage VS according to a dimming input signal $S_{DIMMER}$.

In the embodiment illustrated in FIG. 2, the dimmer switch 120 is a phase-cut dimmer which includes a TRIAC device 22, a DIAC (diode for alternative current) device 24, a variable resistor 26 and a capacitor 28. The TRIAC device 22 and the DIAC device 24 are bi-directional switching elements that can conduct current in either direction when turned on (or triggered). The variable resistor 26 and the capacitor 28 provide a trigger voltage $V_G$ which has a resistor-capacitor (RC) time delay with respect to the AC voltage VS. As depicted in FIG. 3, during the turn-off periods $T_{OFF}$ of a cycle, the trigger voltage $V_G$ is insufficient to turn on the TRIAC device 22, thereby cutting off the AC voltage VS from the rectifier circuit 130 ($V_{DIM}$=0). During the turn-on periods $T_{ON}$ of a cycle when the trigger voltage $V_G$ exceeds the threshold voltage of the TRIAC device 22, the TRIAC device 22 is turned on and conducts the system current $I_{SYS}$. As long as the system current $I_{SYS}$ is kept above the minimum holding current of the TRIAC device 22, the AC voltage VS may be supplied to the rectifier circuit 130 (the waveform of $V_{DIM}$ follows the waveform of $V_{AC}$).

In the LED lighting system 100, the dimmer switch 120 determines the amount of adjustment applied to the AC voltage VS provided by the power supply circuit 110 based on the value of the dimming input signal $S_{DIMMER}$ applied to the dimmer switch 120. In some implementations, the dimming input signal $S_{DIMMER}$ is an analog signal produced by a knob, slider switch, or other suitable electrical or mechanical device capable of providing an adjustment signal with a variable range of adjustment settings. In other implementations, the dimming input signal $S_{DIMMER}$ is a digital signal. However, the implementation of the dimming input signal $S_{DIMMER}$ does not limit the scope of the present invention.

In the embodiment illustrated in FIG. 2, the value of the variable resistor 26 may be adjusted according to the dimming input signal $S_{DIMMER}$ for changing the RC time delay of the trigger voltage $V_G$ with respect to the AC voltage VS, thereby adjusting the length of the turn-off periods $T_{OFF}$ and turn-on periods $T_{ON}$ of the voltage $V_{DIM}$. Since the light output intensity of the luminescent unit 150 is substantially proportionally to the rectified voltage $V_{AC}$ whose value is associated with the voltage $V_{DIM}$, the system current $I_{SYS}$ flowing through the luminescent unit 150 may be controlled in a regulated manner that provides a smooth transition in light intensity level output of the luminescent unit 150 responsive to the dimming input signal $S_{DIMMER}$ without perceivable flicker.

Figure 4:
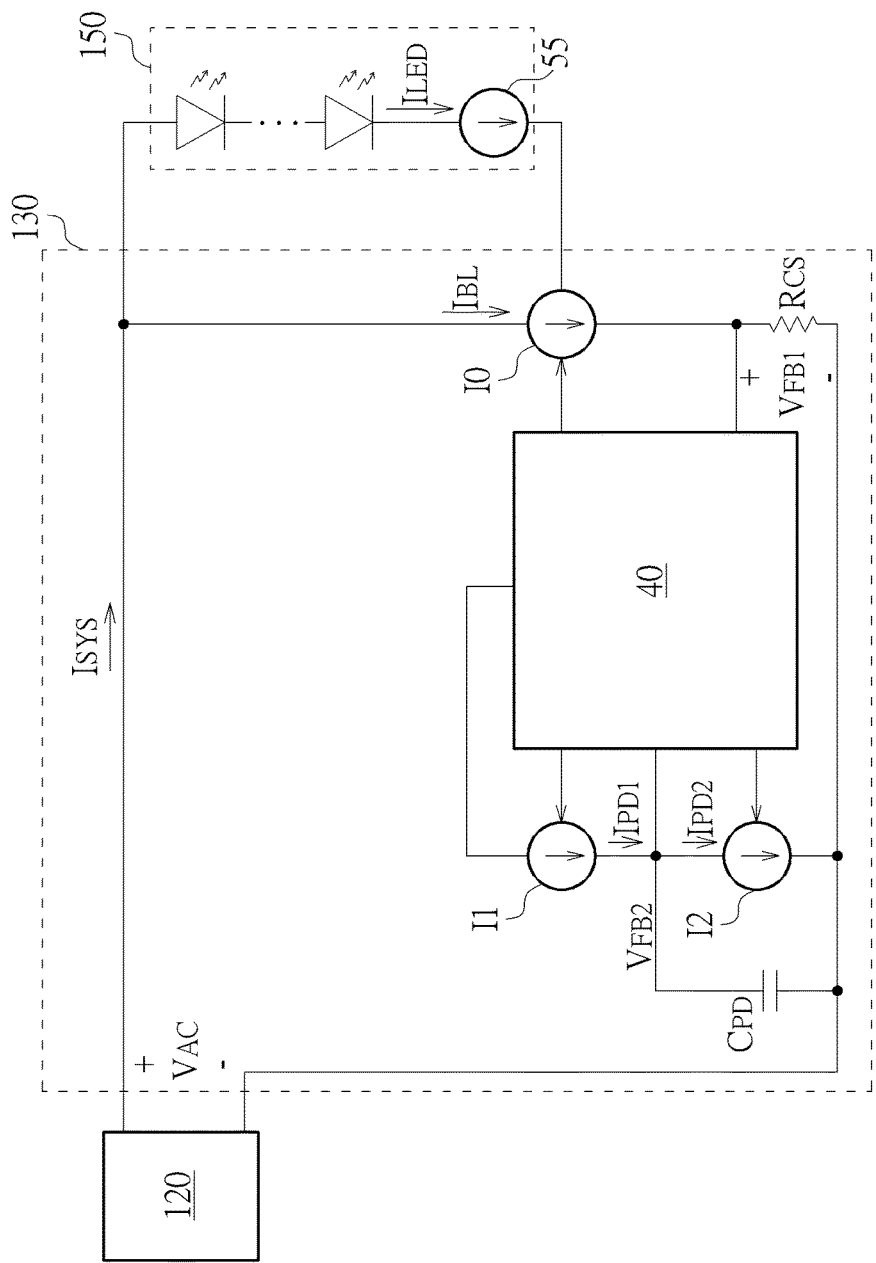
FIG. 4 is a diagram illustrating a bleeder circuit in an LED lighting system according to an embodiment of the present invention.

FIG. 4 is a diagram illustrating the bleeder circuit 130 in the LED lighting system 100 according to an embodiment of the present invention. The bleeder circuit 130 includes three current sources I0~I2, a current-sensing element $R_{CS}$, a capacitor $C_{PD}$, and a control unit 40. After power-on, the level of the system current $I_{SYS}$ may be monitored according to a feedback voltage $V_{FB1}$ established across the current-sensing element $R_{CS}$. In an embodiment, the current-sensing element $R_{CS}$ may be a resistor, but the implementation of the current-sensing element $R_{CS}$ does not limit the scope of the present invention.

When the rectified AC voltage $V_{AC}$ is insufficient to turn on the luminescent unit 150, the current $I_{LED}$ flowing through the luminescent unit 150 is substantially zero. Under such circumstance, the control unit 40 is configured to activate the current source I0 to supply the bleeder current $I_{BL}$, so that the system current $I_{SYS}$ may be kept above the minimum holding current of the TRIAC device 22 (not shown in FIG. 4) in the dimmer switch 120. When the rectified AC voltage $V_{AC}$ is large enough to turn on the luminescent unit 150, the luminescent unit 150 starts to conduct and the current $I_{LED}$ varies with the rectified AC voltage $V_{AC}$. Once the current $I_{LED}$ flowing through the luminescent unit 150 reaches the system current $I_{SYS}$, the current $I_{LED}$ is regulated by the driver (designated by numeral 55 in FIG. 4) of the luminescent unit 150 and kept at a constant level. Once the current $I_{LED}$ flowing through the luminescent unit 150 exceeds the minimum holding current of the TRIAC device 22 in the dimmer switch 120, the current $I_{LED}$ is sufficient to sustain stable operation of the dimmer switch 120. Under such circumstance, the control unit 40 is configured to deactivate the current source I0 to stop supplying the bleeder current $I_{BL}$. In another embodiment, the current source I0 may be configured to adjust the bleeder current $I_{BL}$ according to the current $I_{LED}$ flowing through the luminescent unit 150 so that ($I_{BL}$+$I_{LED}$) may be sufficient to sustain stable operation of the dimmer switch 120.

Meanwhile, when the feedback voltage $V_{FB1}$ indicates that the system current $I_{SYS}$ has reached a predetermined threshold $I_{TH}$, the control unit is configured to activate the current source I1 and disable the current source I2 for charging the capacitor $C_{PD}$. When the feedback voltage $V_{FB1}$ indicates that the system current $I_{SYS}$ does not exceed the predetermined threshold $I_{TH}$, the control unit is configured to disable the current source I1 and activate the current source I2 for discharging the capacitor $C_{PD}$.

Figure 5:
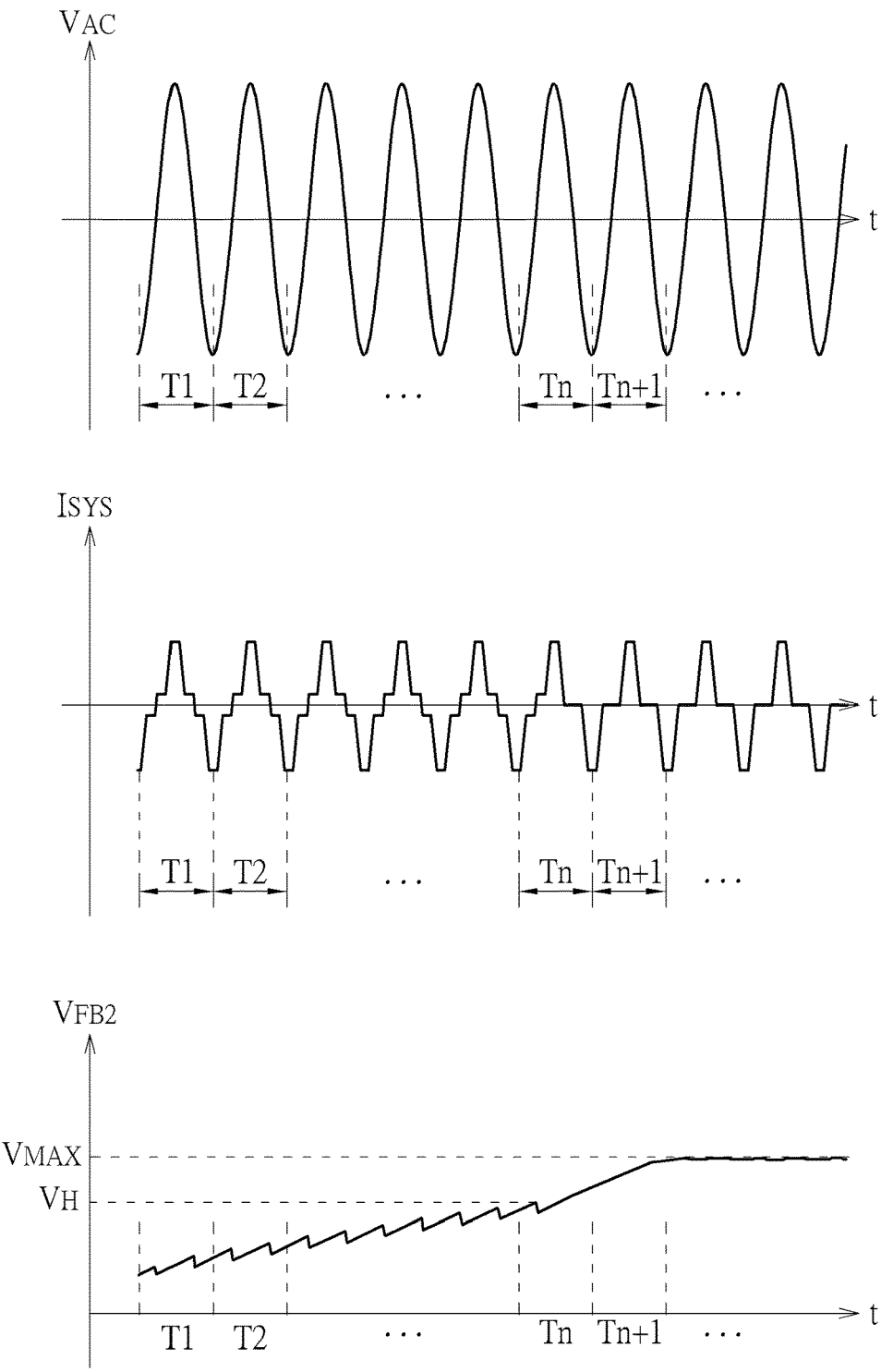
FIGS. 5~7 are diagrams illustrating the current/voltage characteristics of an LED lighting system when a dimmer switch is not in function according to an embodiment of the present invention.
Figure 6:
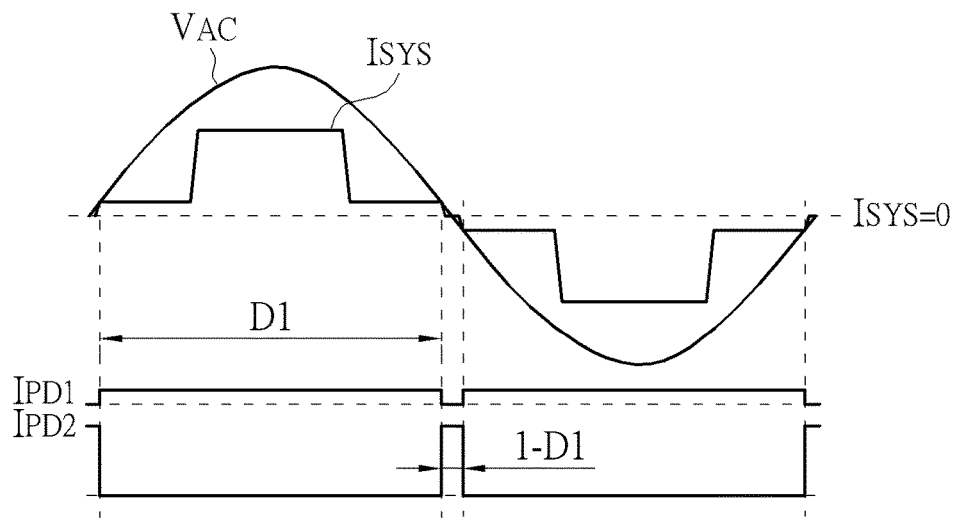
Figure 7:
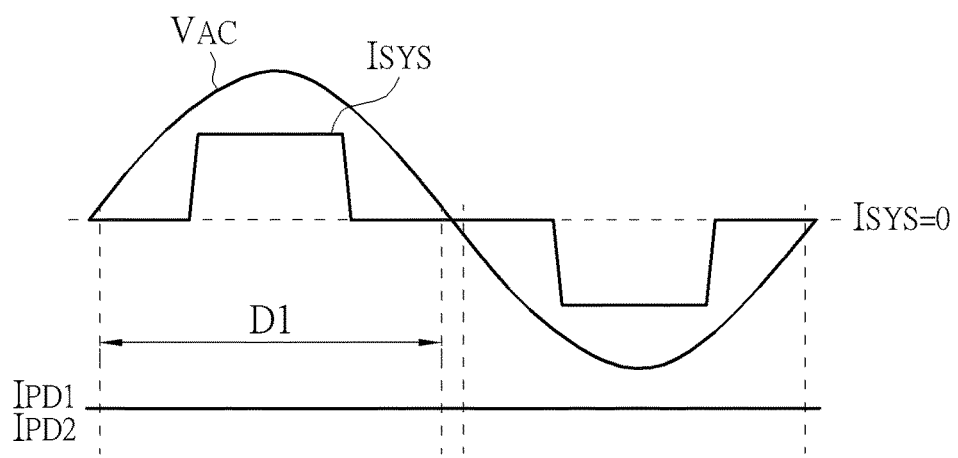

FIGS. 5~7 are diagrams illustrating the current/voltage characteristics of the LED lighting system 100 when the dimmer switch 120 is not in function according to an embodiment of the present invention. FIG. 5 depicts the waveforms of the rectified AC voltage $V_{AC}$, the system current $I_{SYS}$ and feedback voltage $V_{FB2}$ during multiple cycles of the rectified AC voltage $V_{AC}$. FIG. 6 depicts the enlarged waveforms of the rectified AC voltage $V_{AC}$, the system current $I_{SYS}$, the charging current $I_{PD1}$ and the discharging current $I_{PD2}$ during one of the first n cycles T1~Tn (n is a positive integer) of the rectified AC voltage $V_{AC}$. FIG. 7 depicts the enlarged waveforms of the rectified AC voltage $V_{AC}$, the system current $I_{SYS}$, the charging current $I_{PD1}$ and the discharging current $I_{PD2}$ during one of the cycles subsequent to the cycle Tn of the rectified AC voltage $V_{AC}$.

In the LED lighting system 100 with the dimmer switch 120 not in function, the duty cycle D1 of the system current $I_{SYS}$ (the period when $I_{SYS}$>$I_{TH}$) is normally larger than 95%, as depicted in FIGS. 6 and 7. In FIG. 5, the feedback voltage $V_{FB2}$ established across the capacitor $C_{PD}$ has a zigzag waveform during the first n cycles T1~Tn of the rectified AC voltage $V_{AC}$, wherein the rising segments represent the charging period of the capacitor $C_{PD}$ and the falling segments represent the discharging period of the capacitor $C_{PD}$. By setting the value of the current sources I1 and I2 to allow the charging energy $I_{PD1}$*D1 of the capacitor $C_{PD}$ to be larger than the discharging energy $I_{PD2}$*(1−D1) of the capacitor $C_{PD}$, the feedback voltage $V_{FB2}$ established across the capacitor $C_{PD}$ gradually increases, as depicted in FIG. 5. When the feedback voltage $V_{FB2}$ reaches an upper threshold voltage $V_H$ during the cycle Tn, the control unit 40 is configured to clamp the feedback voltage $V_{FB2}$ at an upper limit voltage $V_{MAX}$ larger than $V_H$ and disable the current source I0 for stop supplying the bleeder current $I_{BL}$ during the cycles subsequent to the cycle Tn, as depicted in FIG. 5. Therefore, the system current $I_{SYS}$ can be reduced when the dimming function is not required, thereby reducing the power consumption of the LED lighting system 100.

Figure 8:
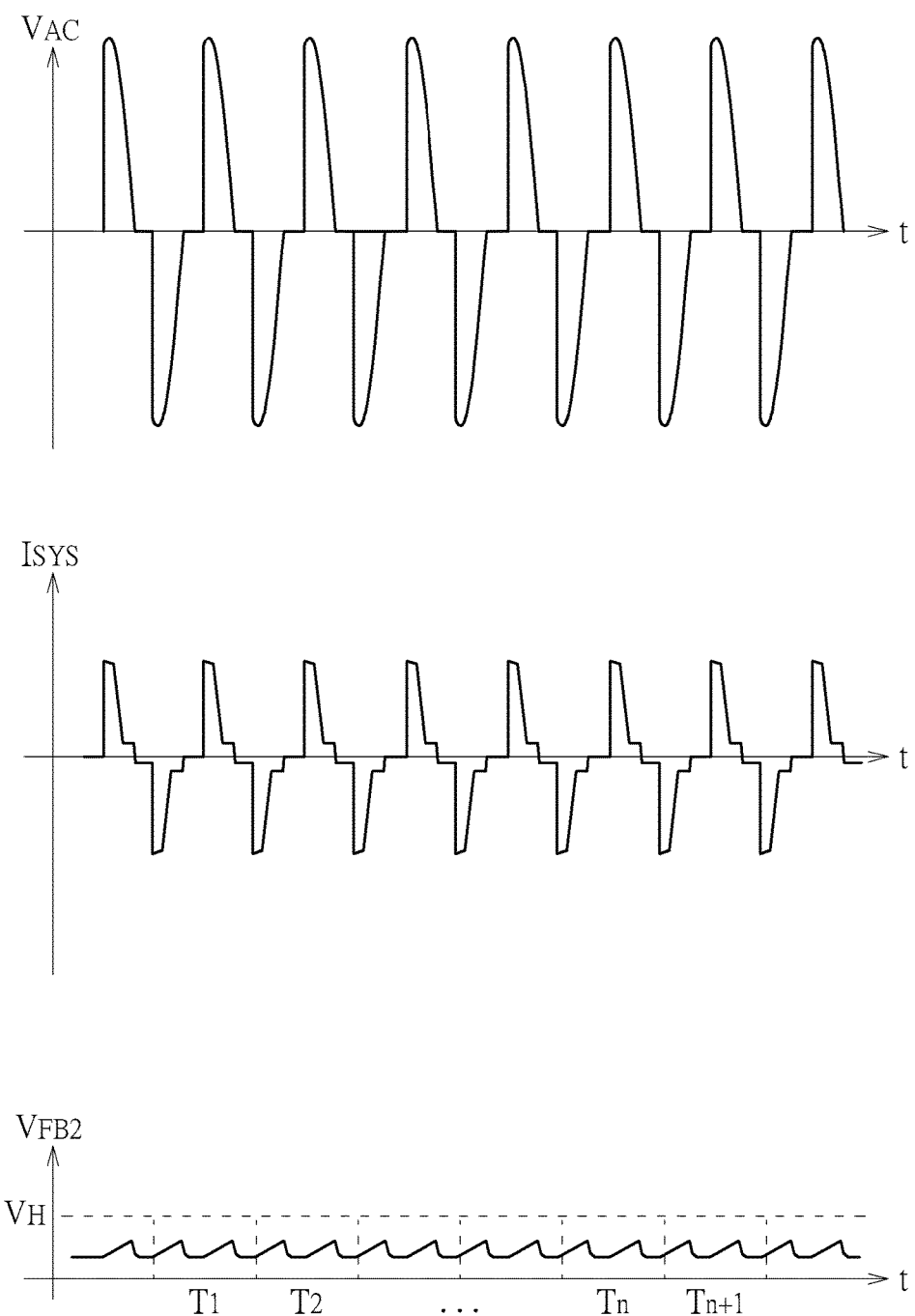
FIGS. 8 and 9 are diagrams illustrating the current/voltage characteristics of an LED lighting system when a dimmer switch is in function according to an embodiment of the present invention.
Figure 9:
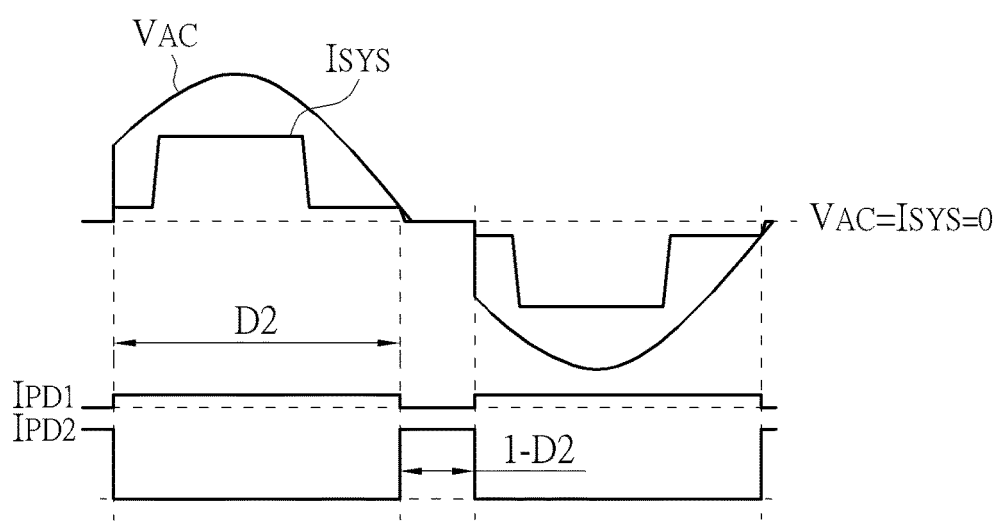

FIGS. 8 and 9 are diagrams illustrating the current/voltage characteristics of the LED lighting system 100 when the dimmer switch 120 is in function according to an embodiment of the present invention. FIG. 8 depicts the current/voltage characteristics of the LED lighting system 100 during multiple cycles of the rectified AC voltage $V_{AC}$. FIG. 9 depicts the enlarged waveforms of the rectified AC voltage $V_{AC}$, the system current $I_{SYS}$, the charging current $I_{PD1}$ and the discharging current $I_{PD2}$ during one cycle of the rectified AC voltage $V_{AC}$.

In the LED lighting system 100 when the dimmer switch 120 is in function, the duty cycle D2 of the system current $I_{SYS}$ (the period when $I_{SYS}>I_{TH}$) is normally less than 90%, as depicted in FIG. 9. In FIG. 8, the feedback voltage $V_{FB2}$ has a zigzag waveform, wherein the rising segments represent the charging period of the capacitor $C_{PD}$ and the falling segments represent the discharging period of the capacitor $C_{PD}$. By setting the value of the current sources I1 and I2 to allow the charging energy $I_{PD1}*D2$ to be lower than or equal to the discharging energy $I_{PD2}*(1-D2)$ of the capacitor $C_{PD}$, the feedback voltage $V_{FB2}$ established across the capacitor $C_{PD}$ remains at a level substantially lower than the upper threshold voltage $V_H$, as depicted in FIG. 8. Under such circumstance, the current source I0 continues to supply the bleeder current $I_{BL}$. Therefore, the bleeder current $I_{BL}$ can be supplied to ensure that the system current $I_{SYS}$ is kept above the minimum holding current of the TRIAC device 22, thereby allowing proper operation of the dimmer switch 120 in the LED lighting system 100.

As previously state, the total charging time and the total discharging time of the capacitor $C_{PD}$ is determined by the duty cycle of the system current $I_{SYS}$. Since the dimmer switch 120 in the LED lighting system 100 results in different duty cycles of the system current $I_{SYS}$ depending whether it is in function, the present invention can determine whether the supply of the bleeder current $I_{BL}$ for dimmer function is required by monitoring the feedback voltage $V_{FB2}$ established across the capacitor $C_{PD}$. Therefore, the present invention can ensure proper dimmer function when required and reduce power consumption when the dimmer function is not required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting system, comprising:
   a luminescent unit driven by a rectified alternative-current (AC) voltage; and
   a bleeder circuit comprising:
      a first current source configured to provide a charging current;
      a second current source configured to provide a discharging current;
      a third current source configured to provide a bleeder current;
      a current-sensing element for providing a first feedback voltage associated with a level of the system current;
      a capacitor; and
      a control unit configured to:
         activate the first current source and deactivate the second current source for charging the capacitor when the system current exceeds a predetermined threshold according to the first feedback voltage;
         deactivate the first current source and activate the second current source for discharging the capacitor when the system current does not exceed the predetermined threshold according to the first feedback voltage; and
         deactivate the third current source to stop supplying the bleeder current according to a second feedback voltage established across the capacitor.

2. The LED lighting device of claim 1, wherein the control unit is further configured to:
   stop supplying the bleeder current when the second feedback voltage exceeds an upper threshold voltage; and
   clamp the second feedback voltage at an upper limit voltage larger than the upper threshold voltage.

3. The LED lighting device of claim 1, wherein the control unit is further configured to activate the third current source for supplying the bleeder current when the system current is lower than a minimum holding current of a dimmer switch.

4. The LED lighting device of claim 1, wherein: a duty cycle of the system current is equal to a value D1 when a dimmer switch is not in function; and the dimmer switch is further configured to adjust the duty cycle of the system current to a value D2 according to a dimming input signal when in function; and D2 is smaller than D1.

5. The LED lighting device of claim 4, wherein:
   the charging current is equal to a value $I_{PD1}$;
   the discharging current is equal to a value $I_{PD2}$;
   $I_{PD1}*D1$ is larger than $I_{PD2}*(1-D1)$ when the dimmer switch is not in function;
   $I_{PD1}*D2$ is smaller than or equal to $I_{PD2}*(1-D2)$ when the dimmer switch is in function.

6. The LED lighting device of claim 1, wherein a dimmer switch comprises a TRIAC (triode for alternative current) device configured to phase modulate the rectified AC voltage, thereby adjusting a duty cycle of the system current.

7. The LED lighting device of claim 1, further comprising a dimmer switch configured to control an amount of light output by the luminescent unit by adjusting a duty cycle of a system current, wherein an operation of the dimmer switch is sustained by the bleeder current.

* * * * *